United States Patent [19]

Horton et al.

[11] Patent Number: 5,641,114
[45] Date of Patent: Jun. 24, 1997

[54] CONTROLLED TEMPERATURE BONDING

[75] Inventors: Raymond Robert Horton, Dover Plains; Chandrasekhar Narayan, Hopewell Junction; Michael Jon Palmer, Walden, all of N.Y.

[73] Assignee: International Business Machines Corporation, Armonk, N.Y.

[21] Appl. No.: 475,255

[22] Filed: Jun. 7, 1995

[51] Int. Cl.⁶ .................... B23K 31/02; B23K 37/00
[52] U.S. Cl. ................... 228/222; 228/6.2; 228/59; 228/214; 228/232
[58] Field of Search ................. 228/214, 222, 228/59, 6.2, 232, 46

[56] References Cited

U.S. PATENT DOCUMENTS

| | | | |
|---|---|---|---|
| 4,972,988 | 11/1990 | Ohdate | 228/232 |
| 5,478,008 | 12/1995 | Takahashi | 228/214 |

FOREIGN PATENT DOCUMENTS

| | | | |
|---|---|---|---|
| 246872A1 | 6/1987 | Germany | 228/6.2 |

OTHER PUBLICATIONS

O'Mara, W.C., "Active Matrix Liquid Crystal Displays—Part 1: Manufacturing Process", *Solid State Technology*, Dec. 1991, pp. 65–70.

Plach, et al., "Liquid Crystals for Active Matrix Displays", *Solid State Technology*, Jun. 1992, pp. 186–193.

Primary Examiner—P. Austin Bradley
Assistant Examiner—Jeffrey T. Knapp
Attorney, Agent, or Firm—Daniel P. Morris; Alvin J. Riddles

[57] ABSTRACT

In a bonding station the parts of the apparatus to be bonded are retained at a thermal bias temperature at a permitted level and a thermal check valve interface is provided between the bonding location and the part of the station that would serve as a conduction heat sink, thereby thermally insulating other uninvolved parts of the structure and and confining the bonding heat to the bonding region. Such confinement reduces the dwell time that the bond must remain at the bonding temperature. The bonding station has a number of features: the parts to be bonded are maintained on a support member that is provided with a heat biasing capability that can establish the assembly at a specified temperature; a retention capability, such as the use of vacuum, is provided to maintain registration and thermal contact of the part with the support; and a thermal check valve capability is provided to control the rate of heat flow through the support member so that locallized heat is controlled in dissipation.

12 Claims, 1 Drawing Sheet

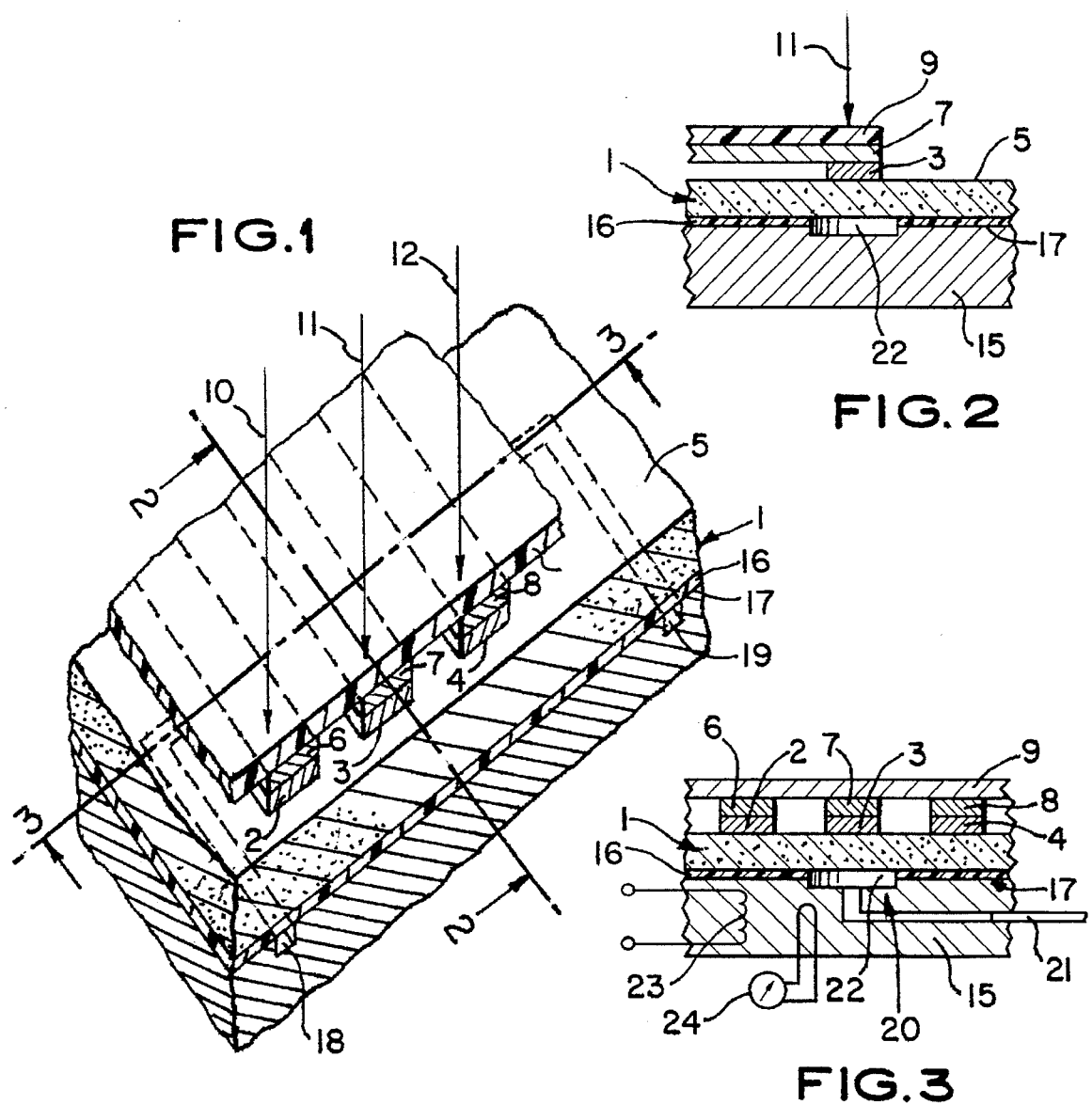

CONTROLLED TEMPERATURE BONDING

FIELD OF THE INVENTION

The invention is in the field of tools for use in the manufacturing of electronic apparatus in sizes that are smaller than the normal positioning tolerances in the art and involving materials that require special temperature consideration and in particular to the formation of bonds where the bonding related heat is restrained from conduction away from the bonding interface.

BACKGROUND OF THE INVENTION

In the fabrication of electronic apparatus downsizing efforts have reached a level that objects that are not rigid, are temperature sensitive and which have connections that are spaced at a pitch so close that the connections are at less than normal positioning tolerances must be assembled into an operational apparatus.

An illustration of such a situation is present in an aspect of the evolving technology of flat panel displays, known in the art as active matrix technology. In the active matrix type technology in essence semiconductor switching and amplification is provided at each pixel of the display raster mounted in a translucent assembly. An illustration of a manufacturing process in the active matrix technology is described in the technical article titled "Active Matrix Liquid Crystal Displays, Part 1, Manufacturing Process" by William C. O'Mara in the Journal "Solid State Technology", December 1991, pages 65–70. The liquid crystals themselves and the driving circuits therefor are described in the technical article titled "Liquid Crystals for Active Matrix Displays", by H. Plach et al, in the Journal "Solid State Technology", June 1992, Pages 186–193.

In technologies where there are fine pitch connections that have to be made to deposited pads and conductors on non-rigid or flexible substrates in the proximity to temperature sensitive conditions such as are encountered in the example active matrix technology there is a need for tooling that will facilitate the fabrication operations.

SUMMARY OF THE INVENTION

The invention is a tooling principle, wherein, a thermal bias member and a thermal check valve member are provided for holding the members that are to be bonded in registration for the bonding operation, the thermal bias member being operable to minimize bonding temperature excursions and the check valve member being operable to confine and limit temperatures needed at the bonding interface from exceeding tolerances elsewhere in the structure. A retention capability, such as the use of vacuum, is provided to maintain registration and thermal contact of the part with the support.

BRIEF DESCRIPTION OF THE DRAWINGS

FIG. 1 is a perspective view of the structural members of the bonding station with the thermal check valve member in place for a bonding operation.

FIG. 2 is a sectional view along the line 2—2 in FIG. 1 illustrating the relative position of objects being bonded and the thermal bias and thermal check valve members during a bonding operation.

FIG. 3 is a sectional view along the line 3—3 in FIG. 1 illustrating the thermal bias and holding features of the thermal bias member.

FIG. 4 is a perspective view of the thermal check valve member.

FIG. 5 is a top view of the base support member illustrating vacuum retention channels and with the thermal check valve member.

DESCRIPTION OF THE INVENTION

In forming a bond between two objects, such as is the case between opposing electrical contacts, where the bond is the fusion of metal such as solder or the anisotropic conductive film (ACS) type connection, there is often a need to raise the temperature. In the case of the fusion of metal there must be a temperature excursion to and dwell at a temperature level that melts the fusing metal in the contact interface. In the case of adhesive contacting, the heat produced by exothermic reaction as the adhesive changes state must be dissipated at a specified rate. During the bonding period the objects to be bonded must be retained in precise position. In some technologies, such as the active matrix display technology, the parts between which the bond is to take place may be flexible and may involve connections between conductors on a flexible backing and connector pads on a semiconductor crystal. The temperature excursion and dwell in bonding operations frequently exceeds the permissible temperature to which the parts of the apparatus can be exposed.

In accordance with the invention, one part of the apparatus to be bonded is conveyed to and positioned in registration at a bonding station, the second part of the apparatus to be bonded is retained in registration with the first part at a thermal bias temperature at a permitted level for the apparatus being fabricated and a thermal check valve interface is provided between the second part and the part of the structure that would serve as a conduction heat sink thereby thermally insulating other uninvolved parts of the structure and confining the bonding heat to the bonding region which in turn reduces the dwell time that the bond must remain at the bonding temperature. Further, in accordance with the invention, the bonding station has a number of features; the parts to be bonded are maintained on a support member that is provided with a heat biasing capability that can establish the assembly at a specified temperature such as the maximum permitted temperature of the apparatus being fabricated during any temperature excursion operation; a retention capability, such as the use of vacuum, is provided to maintain registration and thermal contact of the part with the support, a thermal check valve capability is provided to control the rate of heat through the support member so that locallized heat is controlled in dissipation.

Referring to FIG. 1 a perspective view is provided of the formation of electrical contact bonds between conductors on a flexible backing such as a flex tape conveyed and registered separately to the bonding station, and pads on a thermally conductive substrate (TCS), such as a Si chip, at a bonding station that maintains the semiconductor chip at a thermal bias. In FIG. 1, a first bonding part, the TCS 1 has contact pads 2, 3, and 4 on a surface 5. On a second bonding part, such as a flex tape, conveyed to the bonding station separately in the fabrication system, conductors 6, 7 and 8, mounted on a flexible backing 9, are positioned in contact with the pads 2, 3 and 4 respectively. During the bonding operation, heat and pressure to the extent needed are applied as depicted by arrows 10, 11 and 12, each of which urges a conductor into contact with a pad under heat conditions to produce fusion of solder or the exothermic chemical reaction of an adhesive such as epoxy. Depending on the shape of the structure the functions of arrows 10, 11 and 12 could be performed by a single member. The TCS 1 is mounted on a thermal biasing support member 15 which has the capability, not visible in this figure, of maintaining the parts to be bonded at a temperature acceptable to the apparatus being fabricated. The TCS 1 is separated from the support 15 by a thermal check valve member 16 of a material such as a polyimide film that impedes conductive transfer of any localized heat applied as indicated by arrows 10, 11 and 12 from being dissipated through the supporting structure thus lengthening the dwell time required for the bonding temperature. The TCS 1 is retained on the surface 17 of the support and thermal bias member 15 by a vacuum through passageways 18 and 19 of a vacuum capability 20 that continue, shown dotted, under the TCS 1.

Referring to FIG. 2 which is a section along the line 2—2 of FIG. 1, the members to be bonded are conductor 7 on backing 9 and pad 3 on TCS 1. The thermal check valve member 16 is retained on the surface 17 by a suitable acrylic adhesive. Passageways are produced in member 16 by removing material to produce channels 18 and 19 of FIG. 1 and area 22 in FIG. 2.

Referring next to FIG. 3, which is a side view along the line 3—3 of FIG. 1, and in which like reference numerals are employed as in FIG. 1. The TCS 1 is retained in registration on the surface 17 of the thermal bias support member 15 by the vacuum capability 20 made up the thermal check valve member 16 with slots 18 and 19 cut into the surface thereof and a pipe 21 connected to an area member and hole 22. The pipe 21 is a press fit, and in turn, is connected to a standard in the art vacuum source, not shown, that supplies an about 1" Hg of vacuum. The thermal bias for the support member 15 is supplied through a resistance heater 23 using an external power supply, not shown. Where useful, instrumentation, such as a thermometer 24 may be provided. An example thermal bias in the support 15 of the bonding station, would be, for a fusion temperature of 180 degrees C. to melt solder at the interfaces of elements 6 and 2, 7 and 3, and 8 and 4; heat supplied through heat capability 23 to maintain the support 15 at a thermal bias temperature of 100 degrees C. which would radically shorten the dwell time at the 180 degrees C. fusion temperature.

Referring to FIG. 4 a perspective view of the thermal check valve member 16 is provided. The thermal check valve member 16 is a layer of a material that transfers heat more slowly than would occur than if the TCS 1 and the support 15 were to be in contact with each other and at a thickness that permits the localized bond temperature to be retained and not immediately conducted away. For the semiconductor, solder bonding example under discussion, at a thermal bias of 100 degrees C., a polyimide film about 150 micro meters or about 0.002 inch thick, would permit long cycle temperature attainment at about 100 degrees C. in ten minutes, and further, would shorten the dwell time of a localized short cycle temperature excursion at 180 degrees C. for fusion at the bonding interfaces, from about half a minute to about 20 seconds. To assist in registration and to assist in possible future reworking operations the thermal check valve film 16 can be provided with a layer 25 of an adhesive that is about 0.001 inch thick that will attach the film 16 on the surface 17.

Referring to FIG. 5, a top view is provided on the surface 17 of the support member 15, illustrating an example pattern of grooves of the vacuum system 20, including grooves 18 and 19 and center area 22, which provide an even retentive force on the interfaces of the TCS 1, the thermal check valve 16 and thermal bias and support member 15 to maintain registration and to insure conduction of the bias temperature to the TCS 1. The magnitude of the retentive force is affected by both the amount of vacuum and the groove pattern area of application.

What has been described is a tooling principle, wherein, in a bonding station, there is provided a thermal bias support member and a thermal check valve member that minimize bonding temperature excursions and confine localized heat at the bonding interface from exceeding tolerances elsewhere in the structure.

What is claimed is:

1. In electronic fabrication apparatus, at a location at which first and second parts are bonded to each other involving a temperature excursion, the improvement comprising in combination a thermal check valve member and:

a thermally biased member in thermal contact with but physically separated by said thermal check valve member from a part to be bonded wherein said combination minimizes bonding temperature excursions and confines short cycle localized heat at the bonding interface.

2. The improvement of claim 1 wherein said thermal check valve member is a polyimide film.

3. The improvement of claim 1 wherein said thermally biased member is a support for a part to be bonded.

4. The improvement of claim 2 wherein said thermally biased member is a support for a part to be bonded.

5. The improvement of claim 4 wherein said first part to be bonded includes conductors on a flex tape and said second part to be bonded includes pads on a thermally conductive substrate.

6. In electronic fabrication apparatus, at a bonding location at which first and second parts are fused to each other involving a temperature excursion, the improvement comprising in combination:

first means positioning said first part to be bonded at said bonding station, and second means positioning said second part to be bonded in registration with said first part at said bonding station, wherein said second positioning means including a thermal biasing support member and a thermal check valve member, said thermal check valve member being positioned between said support member and said second part to be bonded.

7. The improvement of claim 6 wherein said support member includes a heating member.

8. The improvement of claim 7 wherein said thermal check valve member is a polyimide film.

9. The improvement of claim 8 wherein said first part to be bonded is at least one conductor on a flex tape and said second part to be bonded is at least one pad on a semiconductor.

10. The process of minimizing temperature excursions in bonding operations attaching two parts in contact with each other, comprising in combination the steps of:

applying a steady state biasing temperature via a thermally biased member to a first one of said parts, positioning a thermal conduction inhibiting member in a thermal conduction path between said thermally biased member and a thermally conductive substrate of said first one of said parts, and, applying localized attachment heat to the second one of said parts.

11. The process of claim 10 wherein said thermal conduction inhibiting member is a polyimide film.

12. The process of claim 11 wherein said thermal biasing member is comprised of a heater in a support for said first one of said parts.

* * * * *